United States Patent [19]
Nakatani et al.

[11] Patent Number: 5,779,583
[45] Date of Patent: Jul. 14, 1998

[54] CHAIN COVER

[75] Inventors: Masato Nakatani; Kenichiro Ikeda; Nanako Uno, all of Ishikawa, Japan

[73] Assignee: Daido Kogyo Co., Ltd., Kaga, Japan

[21] Appl. No.: 690,992

[22] Filed: Aug. 1, 1996

[30]   Foreign Application Priority Data

Feb. 27, 1995   [JP]   Japan ................................. 7-38667

[51] Int. Cl.$^6$ ................................ B62J 13/00; F16D 1/00
[52] U.S. Cl. ......................... 474/145; 474/144; 474/146; 198/803.01
[58] Field of Search ............................ 474/144, 145, 474/146; 198/465.1, 803.01, 850, 853

[56]   References Cited

U.S. PATENT DOCUMENTS

| | | | |
|---|---|---|---|
| 1,757,652 | 12/1930 | Bethke | 198/853 |
| 2,954,113 | 1/1960 | Hibbard et al. | 198/803.01 |
| 3,738,478 | 6/1973 | Tourtellotte | 198/181 |
| 4,664,253 | 5/1987 | Fahrion | 198/851 |
| 4,854,924 | 8/1989 | Nagano | 474/140 |
| 5,445,569 | 8/1995 | Blase | 474/145 |

*Primary Examiner*—Tamara L. Graysay
*Assistant Examiner*—Gary S. Hartmann
*Attorney, Agent, or Firm*—Wenderoth, Lind & Ponack, L.L.P.

[57]   ABSTRACT

A chain cover including a plurality of first cover blocks and a plurality of second cover blocks. Each of the blocks has a pair of side walls each having a projecting portion at an inner side thereof. The projecting portions have configurations which conform with lateral faces of outer link plates of a chain so as to receive the outer link plates. Each of the first and second cover blocks further has a bridge connecting the side walls, and the side walls are formed with a convex front edge portion and a concave rear edge portion. The concave rear edge portion of the second cover blocks are rotatably slidable on the convex front edge portion of an adjacent one of the first cover blocks. The convex front edge portions and the concave rear edge portions lie along portions of the a cylindrical surface having a central axis including the corresponding pins of the chain. Also, the projecting portions of the first and second cover block are inserted into a space formed by the outer link plates and the inner link plates of the chain. Therefore, the chain cover is able to flex along with the flexing crooking action of the chain.

13 Claims, 8 Drawing Sheets

CHAIN COVER

BACKGROUND OF THE INVENTION

1. Field of the Invention

The present invention is related to a chain cover attached to a chain for loading, and more particularly, to a flexible chain cover attached to a chain which is constructed of outer and inner link plates and pins inserted through the outer and inner link plates.

2. Description of the Related Art

In a conventional roller chain or bushed chain for loading, since items to be loaded are put on the outer and inner link plates directly, the items are not only damaged, but also small items, namely bolts or nuts or other kinds of machine parts drop into the chain and may cause jamming in the chain.

As an improvement to the above conventional chains, a certain cover and top plate which cover the chain have been improved. However, the cover and top plate in the conventional chains, additional workings on the chain for the attachment, namely replacing the pin, drilling or bending of the outer and inner link plates of the chain are required.

SUMMARY OF THE INVENTION

It is an object of the present invention to provide a chain cover which can be easily attached to a chain which is already constructed by outer link plates and inner link plates and pins inserted therethrough without requiring any additional work to be performed on the chain.

It is another object of the present invention to provide a chain cover which can flex along with the flexible crooking action of the chain.

The chain cover according to the present invention, which is to be attached to a chain, includes a first cover block having a pair of side walls which include a projecting portion at each inner side. The projecting portions have configurations which conform with lateral faces of the outer link plates so as to receive the outer link plates. Further, the first cover block has a bridge connecting the side walls, and the side walls are formed so as to be convex at a front end and concave at a rear end.

In addition to the construction described above, the chain cover further includes a second cover block having a pair of side walls, which include a projecting portion at each inner side. The projecting portions have configurations which conform with lateral faces of the outer link plates so as to receive the outer link plates. Further, the second cover block has a bridge connecting the side walls. The side walls are formed so as to be convex at a front end and concave at a rear end.

In the construction described above, the convex and concave portions are areas of the cylinder surfaces of which centers are the centers of the pins of the chain, and the projecting portions of the first cover block and the projecting portions of the second cover block are jointly inserted into a space which is formed by the outer link plates and the inner link plates of the chain. Therefore, the chain cover is able to flex along with the flexibly crooking action of the chain.

DETAILED DESCRIPTION OF THE PREFERRED EMBODIMENTS

Figure 1:
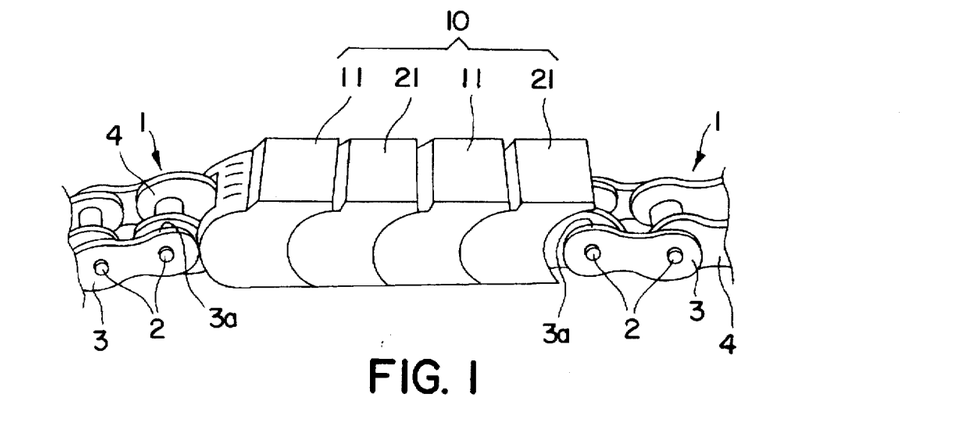
FIG. 1 is a perspective view of a chain cover attached to a roller chain according to the present invention.

FIG. 1 shows a chain cover 10 of the present invention attached to a chain, especially roller chain 1. The roller chain 1 is provided with a plurality of outer link plates 3 and a plurality of inner link plates 4 linked alternately with pins 2. The chain cover 10 in the embodiment comprises a first cover block 11 and a second cover block 21 which are attached to the roller chain, thereby side faces and a top face of the roller chain are covered by the chain cover.

Figure 2:
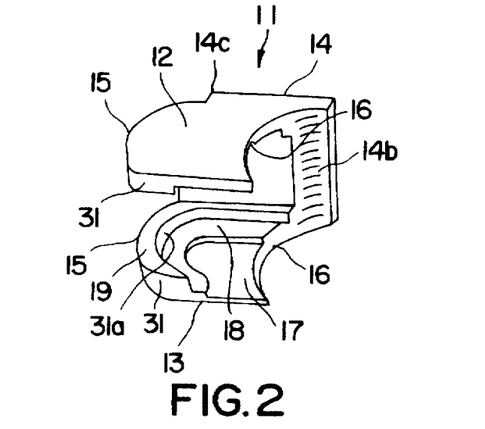
FIG. 2 is a perspective view of a first cover block of the present invention.

As shown in FIG. 2, the first cover block 11 has a pair of side walls 12, 13 and a bridge 14 connecting the side walls 12, 13 and the sidewalls cover almost half of the outer link plates 3. Furthermore, the side walls 12, 13 are formed with a convex front edge portion 15 (left side in FIG. 2) and a concave rear edge portion 16 (right side in FIG. 2). The convex edge portion 15 and the concave edge portion 16 are portions of cylindrical surfaces the centers of which are the centers of the corresponding pins 2 of the roller chain 1.

Each of the side walls 12, 13 has a projecting portion 31 at an inner side which is configured to conform with a lateral face 3a of the corresponding outer link plate 3 so as to receive the outer link plate 3. The projecting portion 31 has an inner most face 19 which contacts the corresponding inner link plate 4 and an inner side face 31a contacting the lateral face 3a of the corresponding outer link plate 3. An inner face 18 which contacts almost half of the corresponding outer link plate 3, is formed with a recess 17 for receiving and passing a pin 2 of the roller chain 1.

Figure 3:
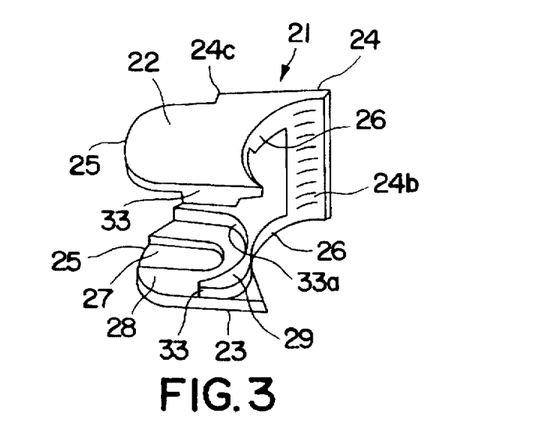
FIG. 3 is a perspective view of a second cover block of the present invention.

As shown in FIG. 3, the second cover block 11 has a pair of side walls 22, 23 and bridge 24 connecting the side walls 22, 23. The sidewalls cover almost half of the outer link plate 3. Furthermore, the side walls 22, 23 are formed with a convex front edge portion 25 (left side in FIG. 3) and with a concave rear edge portion 26 (right side in FIG. 3). The convex front edge portion 25 and concave rear edge portion 26 are part of a cylindrical surface which has a central axis which extends along the pin 2 of the roller chain 1.

Each of the pair of side walls 22, 23 has a projecting portion 33 at an inner side. The projection portion is configured to conform with the lateral face 3a of the corresponding outer link plate 3 so as to receive the outer link plate 3. The projecting portion 33 has an inner most face 29 which contacts the corresponding inner link plate 4, and has an inner side face 33a which contacts the lateral face 3a of the corresponding outer link plate 3. An inner face 28 contacts almost half of the outer link plate 3 and includes a recess 27 for receiving the corresponding pin 2 of the roller chain 1.

Figure 4:
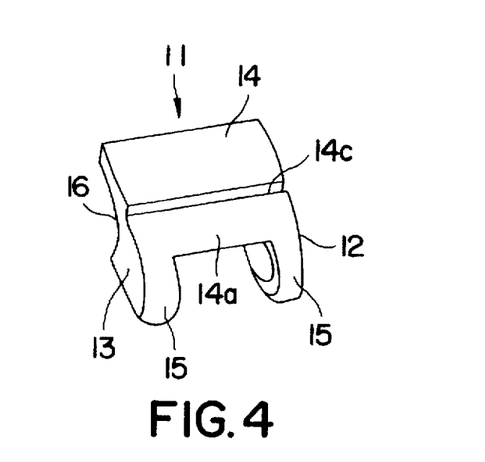
FIG. 4 is a perspective view of the first cover block.

As shown in FIG. 4, the convex front edge portion 15 of each of the side walls 12, 13 is connected with a shelter 14a having a curved surface which is part of the cylindrical surfaces having a central axis which coincides with the center of the corresponding pin 2 of the roller chain 1. Further to the construction described above, there is a step 14c between the bridge 14 and the convex front edge portion 15 connected with the shelter 14a.

Figure 5:
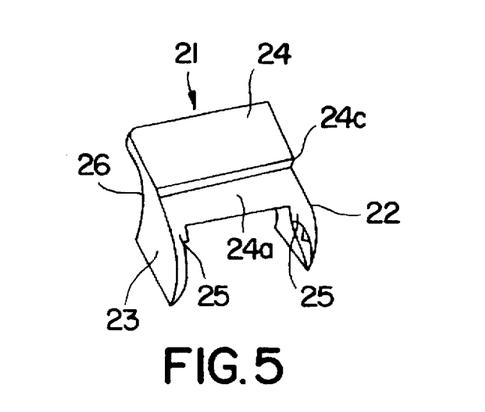
FIG. 5 is a perspective view of the second cover block.

As shown in FIG. 5, the convex front edge portion 25 of the side walls 22, 23 are connected with a shelter 24a having a curved surface which is part of the cylindrical surface having a central axis which coincides with the corresponding pin 2 of the roller chain 1. Further to the construction described above, there is a step 24c between the bridge 24 and the convex front edge portion 25 and connected with the shelter 24a.

In most cases, the material forming first and second cover blocks 11, 21 is molded synthetic resin of chloride vinyl resin or polypropylene resin. However, the material forming the first and second cover blocks 11, 21 should be die-cast aluminum in a case of heavy loading.

Figure 6:
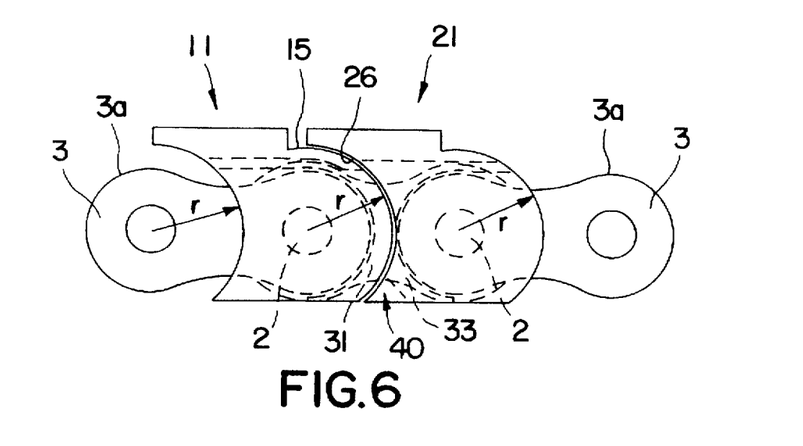
FIG. 6 is a front view of the chain cover attached to the roller chain.
Figure 7:
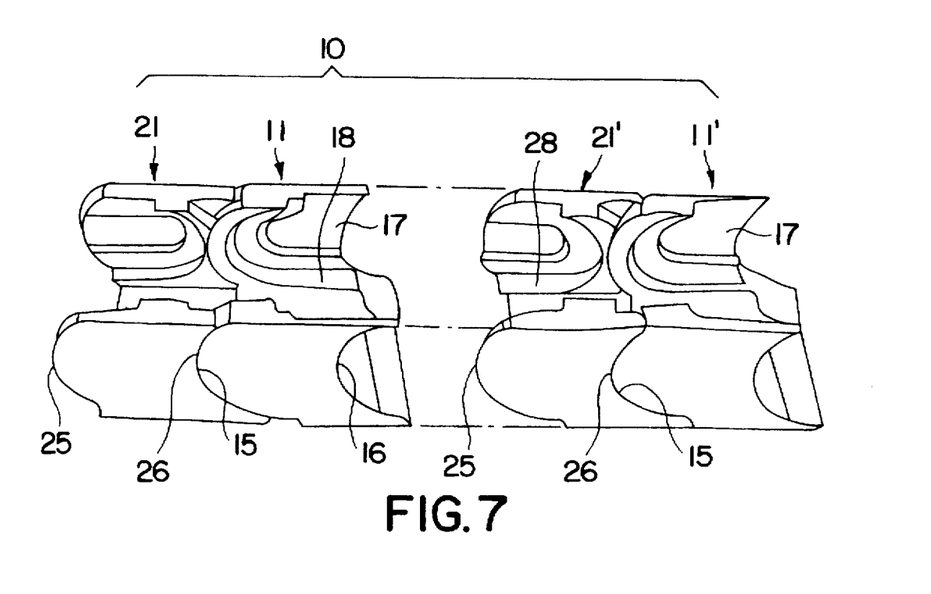
FIG. 7 is a perspective view of the chain cover arrangement without the roller chain.
Figure 8:
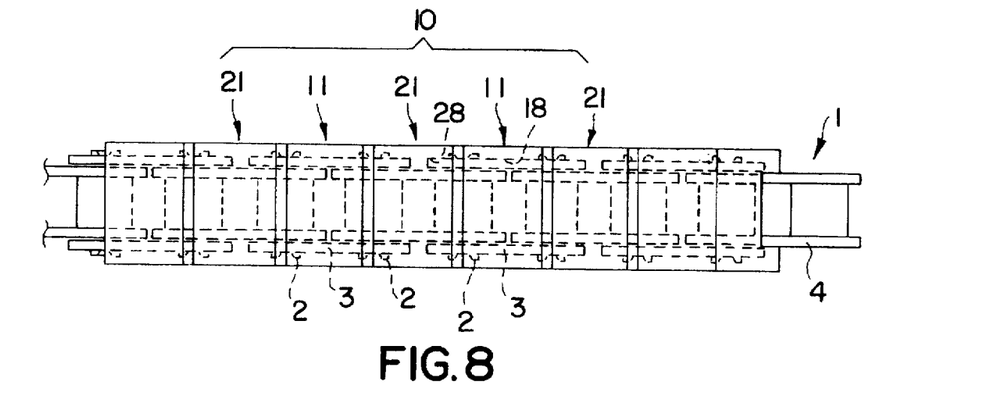
FIG. 8 is a plan view of the chain cover attached to the roller chain.
Figure 9:
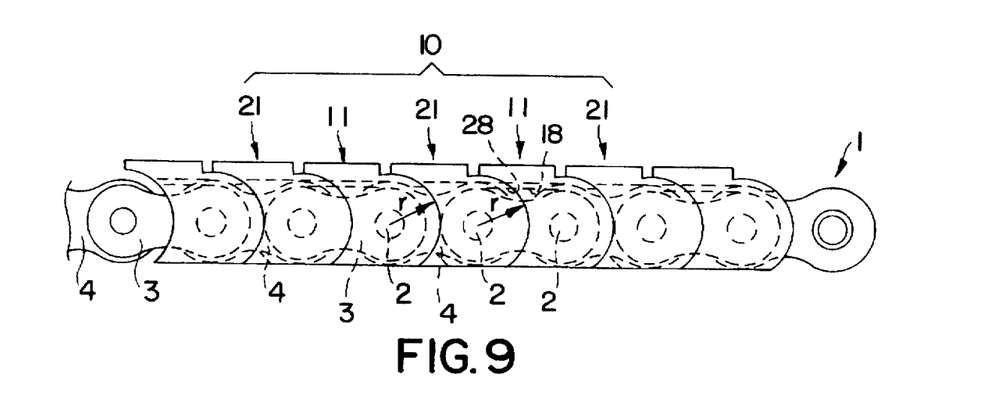
FIG. 9 is a front view of the chain cover attached to the roller chain.
Figure 10:
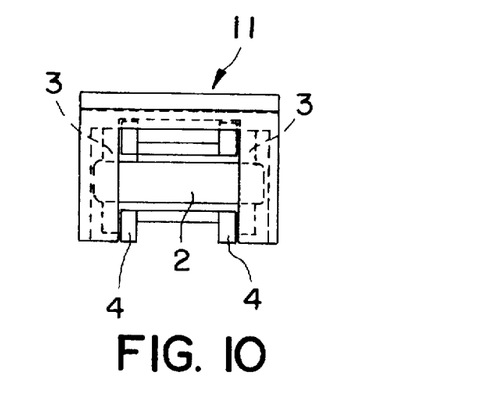
FIG. 10 is a side view of the chain cover attached to the roller chain.
Figure 11:
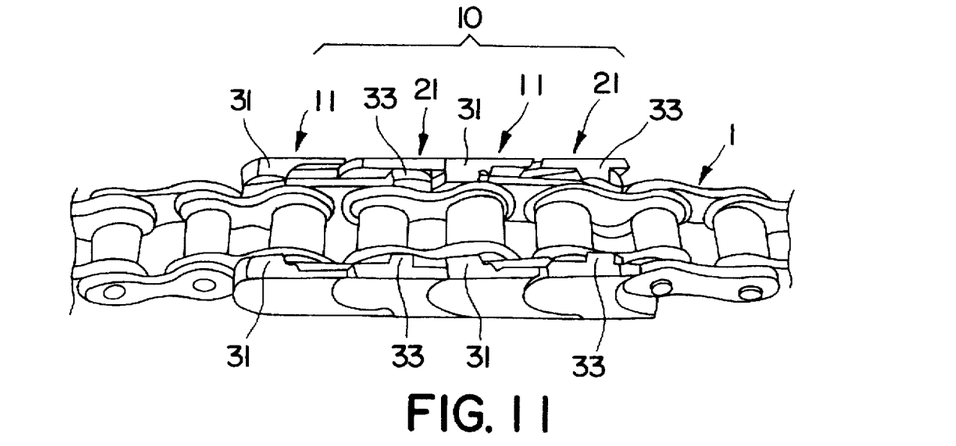
FIG. 11 is a partially sectioned perspective view of the chain cover attached to the roller chain.

As shown in FIG. 6, the projecting portions 31, 33 of the first and second cover blocks 11, 21 are jointly inserted into a space 40 formed between the outer link plates 3 and the inner link plates 4 of the roller chain 1. FIG. 7 shows an arrangement in which a couple of the first cover blocks and a couple of the second cover blocks are connected without showing the roller chain 1.

Namely, the projecting portions 31, 33 of the first and second cover blocks 11, 21 are jointly inserted into the space 40 formed by the outer link plate 3 and the inner link plate 4 of the roller chain 1.

Furthermore, as shown in FIG. 6, the convex first edge portion 15 of the first cover block 11 and the concave rear edge portion 26 of the second cover block 21 are formed as portions of the cylinder surfaces having a central axis which includes the centers of the corresponding pin 2 of the roller chain 1 and of which the radiuses are the common "r" shown in the figure. According to the construction described hereinbefore, the convex front edge portion 15 of the first cover block 11 and the concave rear edge portion 26 of the second cover block 21 are able to rotatably slide relative to each other, and thereby the chain cover 10 can flex along with the flexing action of the roller chain 1.

Referring now to FIGS. 6–15, the attachment of the chain cover 10 of the prevent invention to the roller chain 1 will now be described.

First, the projecting portions 31, 32 of each one of the first and second cover blocks 11, 21 are inserted into one of the spaces 40 enabling the convex front edge portion 15 of the first cover block 11 to rotatably slide with respect to the concave rear edge portion 26 of the second cover block 21, as shown in FIG. 6.

Secondly, projecting portions of each one of the other first and second cover blocks 11', 21' are inserted into a space adjacent to the first space 40 enabling the convex front edge portion 15 of the first cover block 11' to rotatably slide relative to concave front edge portion 26 of the second cover block 21', as shown in FIG. 7.

Therefore, the space 40 is so filled with the projecting portions 31, 33 positioned along the lateral faces 3a of the outer link plates 3 so that no clearance remains in the spaces 40.

Furthermore, since the pins 2 of the roller chain 1 are inserted into the recesses 17, 27, the outer link plates 3 are inserted into the inner side faces 31a and the inner faces 18, the first and second cover blocks 11, 21 are prevented from moving frontwardly, rearwardly, upwardly, or downwardly. Further to the foregoing, the projecting portions 31, 33, inserted into the spaces 40, are biased against each other by their own plasticity. As a result, the first and second cover blocks 11, 21 are further prevented from moving frontwardly, rearwardly, upwardly or downwardly. Therefore, the first and second cover blocks 11, 21 attached to the roller chain 1 are not easily detached therefrom.

FIGS. 8–11 show a plurality of the first and second cover blocks 11, 21 continuously attached to the roller chain 1. Namely, each of the first cover blocks 11 is attached because the recesses 17 thereof receive a corresponding pin 2 of the roller chain 1, the inner faces 18 and the inner side faces 31a thereof receive almost half of the corresponding outer link plate 3 by contacting the outer faces and to the lateral faces 3a of the outer link plates 3 respectively, an the innermost faces 19 of the projecting portions 31 contact the outer faces of the corresponding inner link plates 4.

On the other hand, each of the second cover blocks 21 are also attached in the same manner described above in that the recesses 27 thereof receive a pin 2 of the roller chain 1, the inner faces 28 and inner side faces 33a thereof receive almost half of the outer link plates 3 by contacting the outer faces and the lateral faces 3a of the corresponding outer link plates 3 respectively, and the innermost faces 29 of the projecting portions 33 contact the outer faces of the corresponding inner link plates 4.

Referring now to the attachment of the chain cover 10 of the present invention to the roller chain 1 more specifically based upon FIGS. 12–15, which show one of the first cover block 11 being attached to the roller chain 1 after the second cover blocks 21 and other first blocks 11 are already attached thereto.

Figure 12:
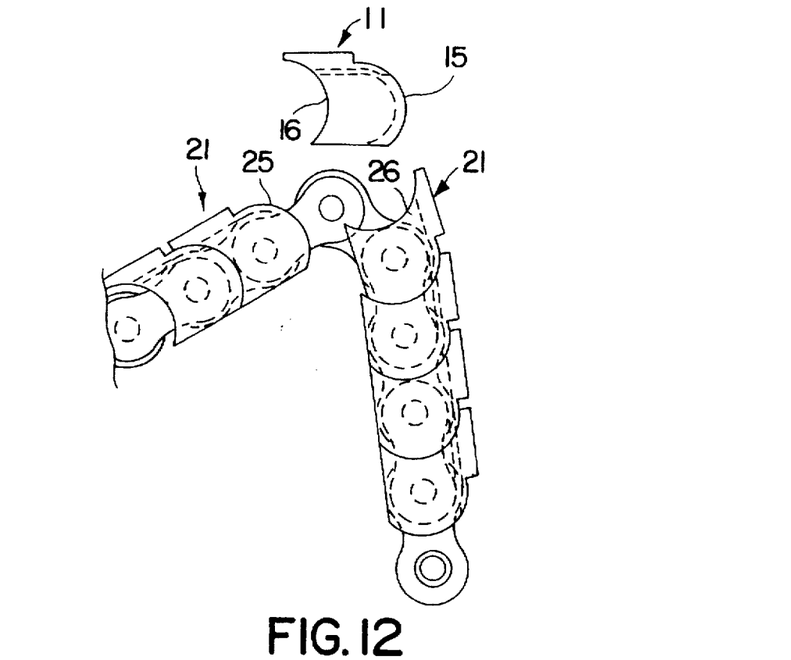
FIG. 12 is a schematic front view of one of the first chain blocks prior to being attached to the roller chain.
Figure 13:
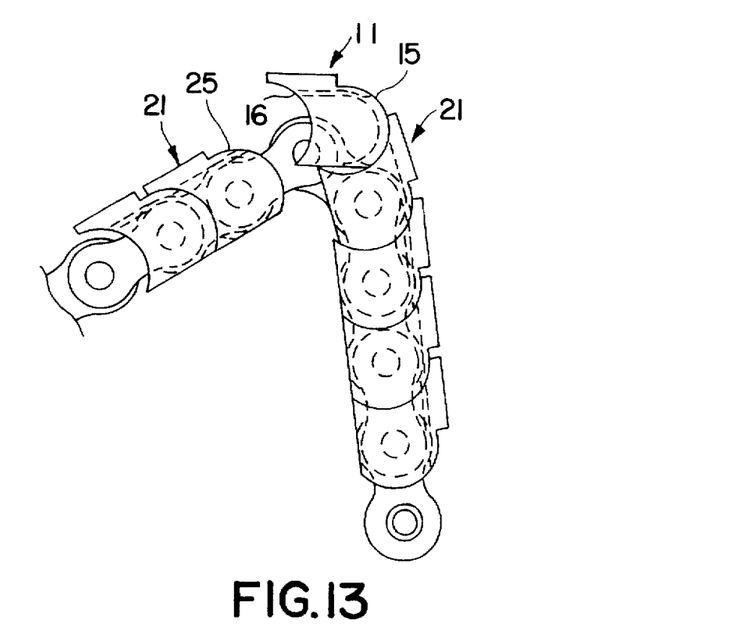
FIG. 13 is a schematic front view of the first chain block shown in FIG. 12 being attached to the roller chain.
Figure 14:
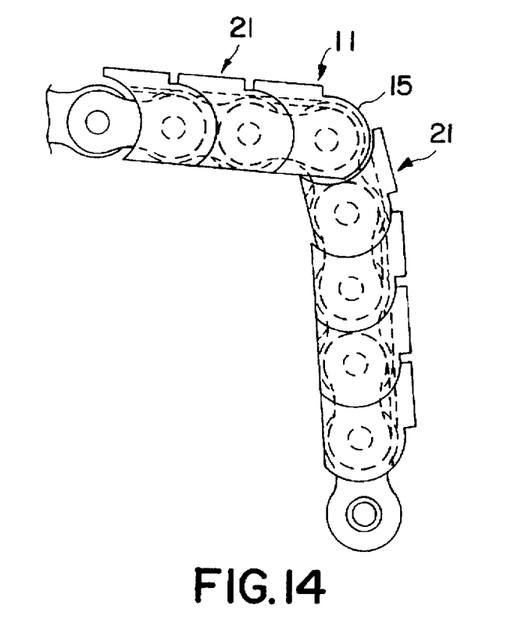
FIG. 14 is a schematic front view of the first chain block completely attached to the roller chain.
Figure 15:
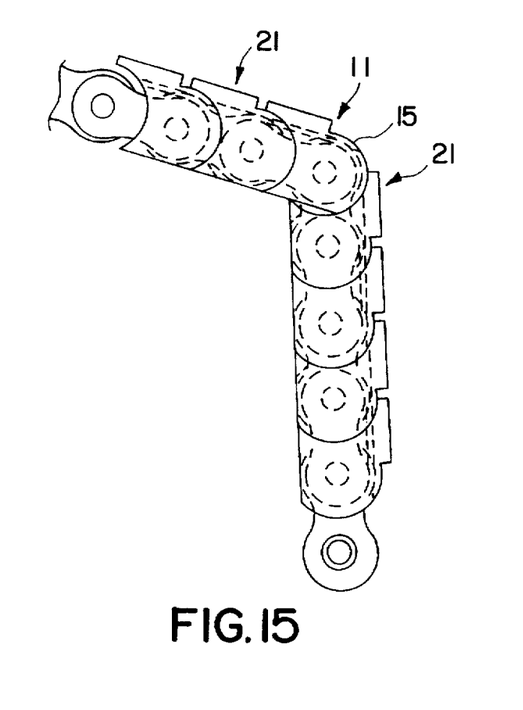
FIG. 15 is a schematic front view of the roller chain to be straightened after the attachment of the chain cover is completed.

After crooking the roller chain 1 at an appropriate angle as shown in FIG. 12, the first cover block 11 starts to be attached to the roller chain 1 in such a manner that the recesses 17 thereof receive the corresponding pin 2 as shown in FIG. 13. The convex front edge portion 15 of the first cover block 11 contacts the concave rear edge portion 26 of the second cover block 21 and the concave rear edge portion 16 of the first cover block 11 receives the convex front edge portion 25 of another one of the second cover blocks 21 as the roller chain 1 is straightened as in a manner of a so-called puzzle-ring, as shown in FIGS. 14–15, and thereby the first cover block 11 is attached to the roller chain 1.

Figure 16:
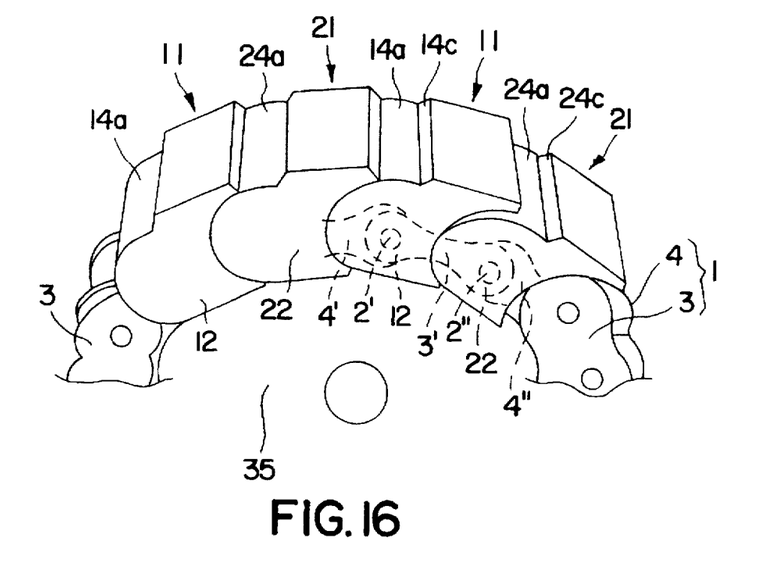
FIG. 16 is a perspective view of the chain cover attached to the roller chain gearing with a sprocket.

According to the preferred embodiment, at a stage where the roller chain 1 gears with a sprocket 35, as shown in FIG. 16, the first cover blocks 11 and second cover blocks 21 rotate and crook on the roller chain 1 as it crooks over the sprocket 35 without jamming each other in such a manner that the first cover blocks 11 rotate about the pin 2' together with the outer link plates 3' and the second cover blocks 21 rotate about the other pin 2" together with the inner link plates 4", respectively. The reason why the first cover blocks 11 rotate about the pin 2' together with the outer link plates 3' and the second cover blocks 21 rotate about the other pin 2" together with the inner link plates 4", is that the inner side faces 31a, 33a are formed along with the lateral faces 3a of the outer link plates 3, and the convex front edge portion 15 of the first cover block 11 is formed so as to contact the concave rear edge portion 26 of the second cover block 21, and that the concave rear edge portion 16 of the first cover block 11 is formed so as to contact the convex front edge portion 25 of the another one of the second cover blocks 21.

According to the construction of the preferred embodiment, the chain cover 10 is arranged alternatively with a plurality of the first and second cover blocks 11, 21 and is able to crook along with the crooking roller chain 1 by restricting free action of the first and second cover blocks 11, 21.

Furthermore, even though at the stage where the roller chain 1 gears with a sprocket 35, as shown in FIG. 16, the first cover block 11 and the second cover block 21 rotate and crook on the roller chain 1 as it crooks over the sprocket 35. Cover portions 14a, 24a cover the roller chain 1 so that the roller chain 1 is not exposed.

Figure 17:
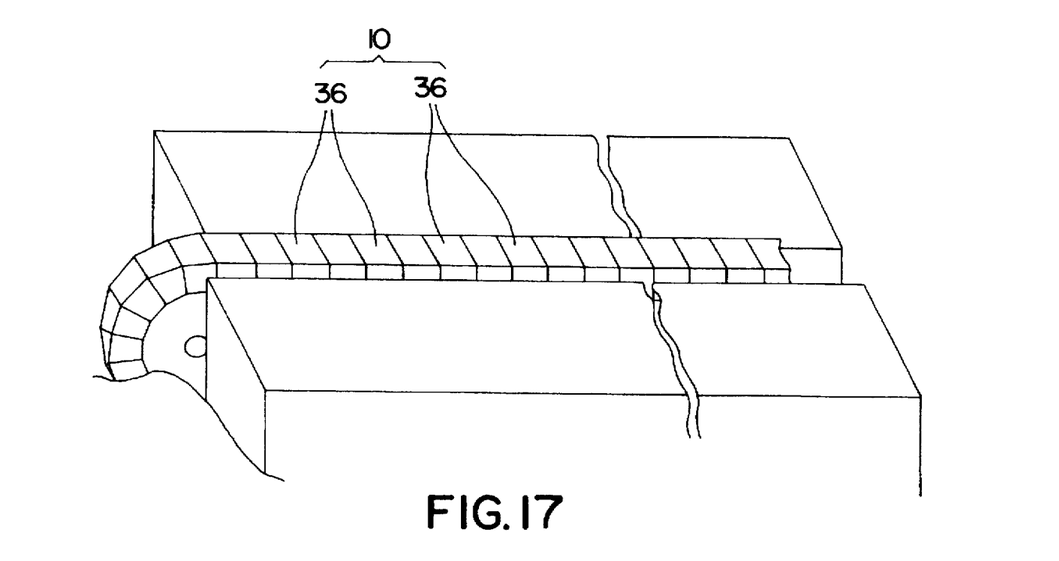
FIG. 17 is a perspective view of a loading table which is partially constructed by the chain cover.

FIG. 17 shows a loading table 36 formed by the bridges 14, 24 for loading items or substances to be loaded. The loading table 36 has a smart and clear appearance and is safe, thereby the loading items or substances are safely loaded. In addition to the constructions described above, the bridges 14, 24 can be formed so as to project outwardly of the opposing sides of the chain cover 10 in order to provide a larger surface area to allow loading of larger items.

The Technical Advantages of the Invention

According to the present invention for the preferred embodiment, the chain cover is easily attached to a chain which is already constructed by outer link plates and inner link plates and pins inserted therethrough without necessitating any additional work on the chain.

The chain cover is not easily detached from the roller chain notwithstanding the fact that the chain cover flexes along with the flexing crooking action of the chain.

Furthermore, even though the chain gears with a sprocket, the first and second cover blocks rotate and crook with the chain as it crooks over the sprocket. The shelters of the first and the second cover blocks cover the chain. Therefore, the bridges of the first and the second cover blocks are able to be used for a loading table to prevent even small substances from falling into and jamming the chain.

What is claimed is:

1. A chain cover for a chain which is formed with a plurality of outer link plates connected alternately to a plurality of inner link plates with pins inserted through said outer and inner link plates, said chain cover comprising:
    a first cover block including a pair of opposing side walls and a bridge connecting said sidewalls,
    each of said side walls of said first cover block having a convex front edge portion, a concave rear edge portion, and an inwardly projecting portion configured so as to conform to the shape of one of the outer link plates of the chain; and
    a second cover block including a pair of side walls and a bridge connecting said sidewalls,
    each of said side walls of said second cover block having a convex front edge portion, a concave rear edge portion, and an inwardly projecting portion which is configured to conform to the shape of one of the outer link plates of the chain,
    wherein said concave rear edge portion of said second cover block is configured to rotatably receive said convex front edge portion of said first cover block, and
    said first cover block and said second cover block are adapted to be inserted into spaces formed between the outer link plates of the chain so that said chain cover can flex along with a flexing action of the chain.

2. The chain cover as claimed in claim 1, wherein each of said side walls of said first and second cover blocks define a recess for receiving one of the chain pins.

3. The chain cover as claimed in claim 1, wherein said first and second cover blocks are formed of molded synthetic resin.

4. The chain cover as claimed in claim 1, wherein said first and second cover blocks are formed of die-cast aluminum.

5. The chain cover as claimed in claim 1, wherein each of said convex and concave portions of first and second blocks, respectively, form a cylindrical surface having a central longitudinal axis which is aligned with a corresponding one of the pins of the chain.

6. The chain cover as claimed in claim 1, wherein said projecting portion of each of said first cover blocks forms said convex front edge portion.

7. The chain cover as claimed in claim 1, wherein said projecting portion of each of said second cover blocks forms said concave rear edge portion.

8. A conveying assembly comprising:
    a chain having a plurality of outer link plates connected alternately to a plurality of inner link plates with pins which are inserted through said outer and inner link plates;
    a plurality of first chain cover blocks mounted on said chain, each of said first cover blocks including a pair of opposing side walls and a bridge connecting said sidewalls,
    each of said side walls of said first chain cover blocks having a convex front edge portion, a concave rear edge portion, and an inwardly projecting portion which engages and conforms to a front edge portion of one of said outer link plates of said chain; and
    a plurality of second chain cover blocks mounted on said chain in an alternating sequence with said first chain cover blocks, each of said second cover blocks including a pair of side walls and a bridge connecting said sidewalls, each of said side walls of said second chain cover blocks having a convex front edge portion, a concave rear edge portion, and an inwardly projecting portion which engages and conforms to a rear edge portion of one of said outer link plates of said chain, wherein said concave rear edge portion of said first cover block rotatably receives said convex front edge portion of an adjacent one of said second cover blocks, said convex and concave portions of said adjacent first and second blocks, respectively, each form a cylindrical surface having a central longitudinal axis which is aligned with a corresponding one of said chain pins, and said projecting portions of said first chain cover block and said second chain cover block are inserted into spaces formed by two adjacent outer link plates of said chain so that said chain cover can flex along with a flexing action of said chain.

9. The conveying assembly as claimed in claim 8, wherein each of said side walls of said first and second cover blocks define a recess in an inner wall thereof, and one of said chain pins is received in said recess.

10. The conveying assembly as claimed in claim 8, wherein said first and second cover blocks are formed of molded synthetic resin.

11. The conveying assembly as claimed in claim 8, wherein said first and second cover blocks are formed of die-cast aluminum.

12. The conveying assembly as claimed in claim 8, wherein said projecting portion of each of said first cover blocks forms said convex front edge portion and extends into one of said chain spaces.

13. The conveying assembly as claimed in claim 8, wherein said projecting portion of each of said second cover blocks forms said concave rear edge portion and, along with a corresponding one of said projecting portions of said first cover blocks, extends into one of said chain spaces.

* * * * *